(12) United States Patent
Halter et al.

(10) Patent No.: US 7,610,741 B2
(45) Date of Patent: Nov. 3, 2009

(54) MOWER WITH FOLDABLE MOWING UNITS

(75) Inventors: Cedric Halter, Wasselonne (FR); Martin Walch, Dettwiller (FR)

(73) Assignee: Kuhn S.A., Saverne (FR)

( * ) Notice: Subject to any disclaimer, the term of this patent is extended or adjusted under 35 U.S.C. 154(b) by 371 days.

(21) Appl. No.: 11/411,140

(22) Filed: Apr. 26, 2006

(65) Prior Publication Data
US 2006/0254242 A1    Nov. 16, 2006

(30) Foreign Application Priority Data
May 10, 2005    (FR)    .................................. 05 04656

(51) Int. Cl.
*A01B 73/00*    (2006.01)
(52) U.S. Cl. ...................................................... 56/228
(58) Field of Classification Search ....................... 56/6, 56/192, 228, 14.5
See application file for complete search history.

(56) References Cited

U.S. PATENT DOCUMENTS

| | | | |
|---|---|---|---|
| 4,182,098 A * | 1/1980 | Kass | ........................... 56/14.5 |
| 4,715,172 A * | 12/1987 | Mosby | ......................... 56/228 |
| 5,351,468 A | 10/1994 | Pominville | |
| 5,417,042 A | 5/1995 | Walch et al. | |
| 5,423,165 A | 6/1995 | Walch et al. | |
| 5,507,136 A | 4/1996 | Walch | |
| 5,749,390 A | 5/1998 | Ermacora et al. | |
| 5,794,424 A | 8/1998 | Ermacora et al. | |
| 5,901,533 A | 5/1999 | Ermacora et al. | |
| 5,901,537 A | 5/1999 | Walch et al. | |
| 5,911,625 A * | 6/1999 | von Allworden | ............ 460/119 |
| 5,992,133 A | 11/1999 | Walch et al. | |
| 6,003,291 A | 12/1999 | Ermacora et al. | |
| 6,055,800 A | 5/2000 | Walch | |
| 6,085,501 A | 7/2000 | Walch et al. | |
| 6,101,796 A | 8/2000 | Wattron et al. | |
| 6,189,306 B1 | 2/2001 | Walch | |
| 6,269,619 B1 | 8/2001 | Walch et al. | |
| 6,308,504 B1 | 10/2001 | Walch et al. | |
| 6,334,292 B1 | 1/2002 | Walch et al. | |
| 6,381,935 B1 | 5/2002 | Wattron et al. | |
| 6,427,428 B1 | 8/2002 | Ermacora et al. | |
| 6,612,102 B2 | 9/2003 | Walch et al. | |
| 6,668,531 B2 | 12/2003 | Wattron et al. | |
| 6,679,038 B2 | 1/2004 | Walch et al. | |
| 6,688,093 B1 * | 2/2004 | Franet et al. | ................... 56/228 |

(Continued)

FOREIGN PATENT DOCUMENTS

EP    406766 A1 *    1/1991

(Continued)

*Primary Examiner*—Alicia M Torres
(74) *Attorney, Agent, or Firm*—Oblon, Spivak, McClelland, Maier & Neustadt, L.L.P.

(57) ABSTRACT

A mower includes a support structure on which are articulated about substantially horizontal axes at least two mowing units each including a frame carrying at least one cutterbar and one conveyor belt, which mowing units can be moved about the axes from a working position to a transport position. The conveyor belts are articulated relative to the cutterbars about conveyor belt axes and the mower further includes a mechanism for automatically moving the conveyor belts about their axes of articulation to bring them closer to the carrier frames and consequently to the middle of the mower when placed in the transport position.

12 Claims, 5 Drawing Sheets

U.S. PATENT DOCUMENTS

| | | | |
|---|---|---|---|
| 2001/0003239 A1 | 6/2001 | Franet | |
| 2001/0045087 A1 | 11/2001 | Franet et al. | |
| 2005/0172598 A1* | 8/2005 | Billard | 56/192 |
| 2006/0248870 A1* | 11/2006 | Geiser | 56/344 |

FOREIGN PATENT DOCUMENTS

| | | |
|---|---|---|
| EP | 1 321 022 A1 | 6/2003 |
| EP | 1 389 413 A2 | 2/2004 |
| EP | 1389413 A2 * | 2/2004 |

* cited by examiner

US 7,610,741 B2

MOWER WITH FOLDABLE MOWING UNITS

BACKGROUND OF THE INVENTION

1. Field of the Invention

The present invention relates to a mower for standing products comprising a support structure on which are articulated by means of substantially horizontal axes at least two mowing units each comprising a frame carrying at least one cutterbar and one conveyor belt for grouping the mown products, which mowing units can be moved about said axes of articulation from a substantially horizontal working position into a substantially vertical transport position and vice versa.

2. Discussion of the Background

In the transport position, these mowers must have a minimal total width such as to allow the users to travel without too many constraints on the roads and tracks. For this reason, the width of the conveyor belts must be reduced so that they do not protrude too much either side of the cutterbars in transport. Now, since the width of these conveyor belts largely determines the volume of the products that they can move, the working widths of these mowers are limited. Specifically, it is not possible to increase said working widths if the machines are desired to be not too exposed to the risks of clogging and blocking at the conveyor belts.

SUMMARY OF THE INVENTION

The object of the present invention is to overcome the aforementioned drawbacks of the known machines.

For this purpose, an important feature of the invention lies in that the mowing units comprise conveyor belts that are articulated relative to the cutterbars by means of axes substantially parallel to said cutterbars and that they comprise means automatically moving said conveyor belts about their axes of articulation to bring them closer to the corresponding carrier frames and consequently to the middle of the mower when placed in the transport position.

This automatic movement of the conveyor belts makes it possible to reduce the width of the machine in transport by bringing them to the rear of the cutterbars and thus preventing them from extending further sideways than said cutterbars themselves. It is thus possible to increase the width of these conveyor belts to improve their capacity to move the products without having a harmful effect on the machine's transport capabilities. This improvement in the capacity to move the products makes it possible to have mowing units with greater working widths in order to increase output.

BRIEF DESCRIPTION OF THE DRAWINGS

Other features and advantages of the invention will emerge from the claims and the following description of a nonlimiting exemplary embodiment of the invention, with reference to the appended drawings in which:

DESCRIPTION OF THE PREFERRED EMBODIMENT

Figure 1:
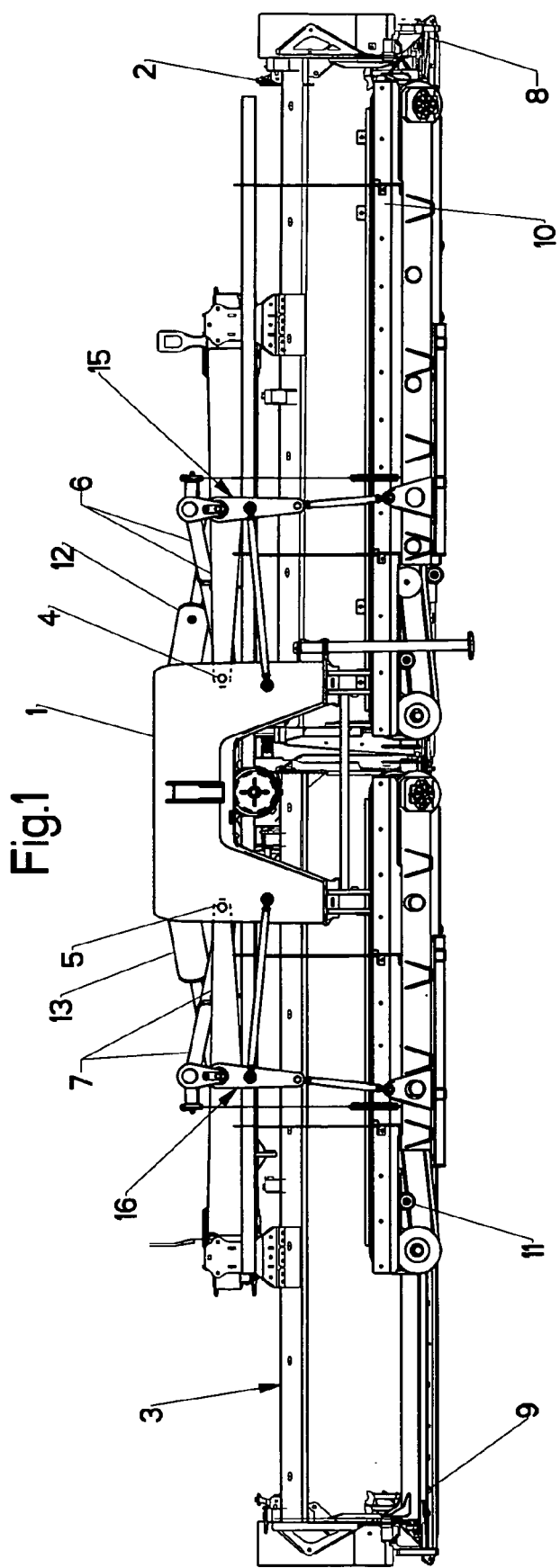
FIG. 1 represents a machine according to the invention in the working position.
Figure 2:
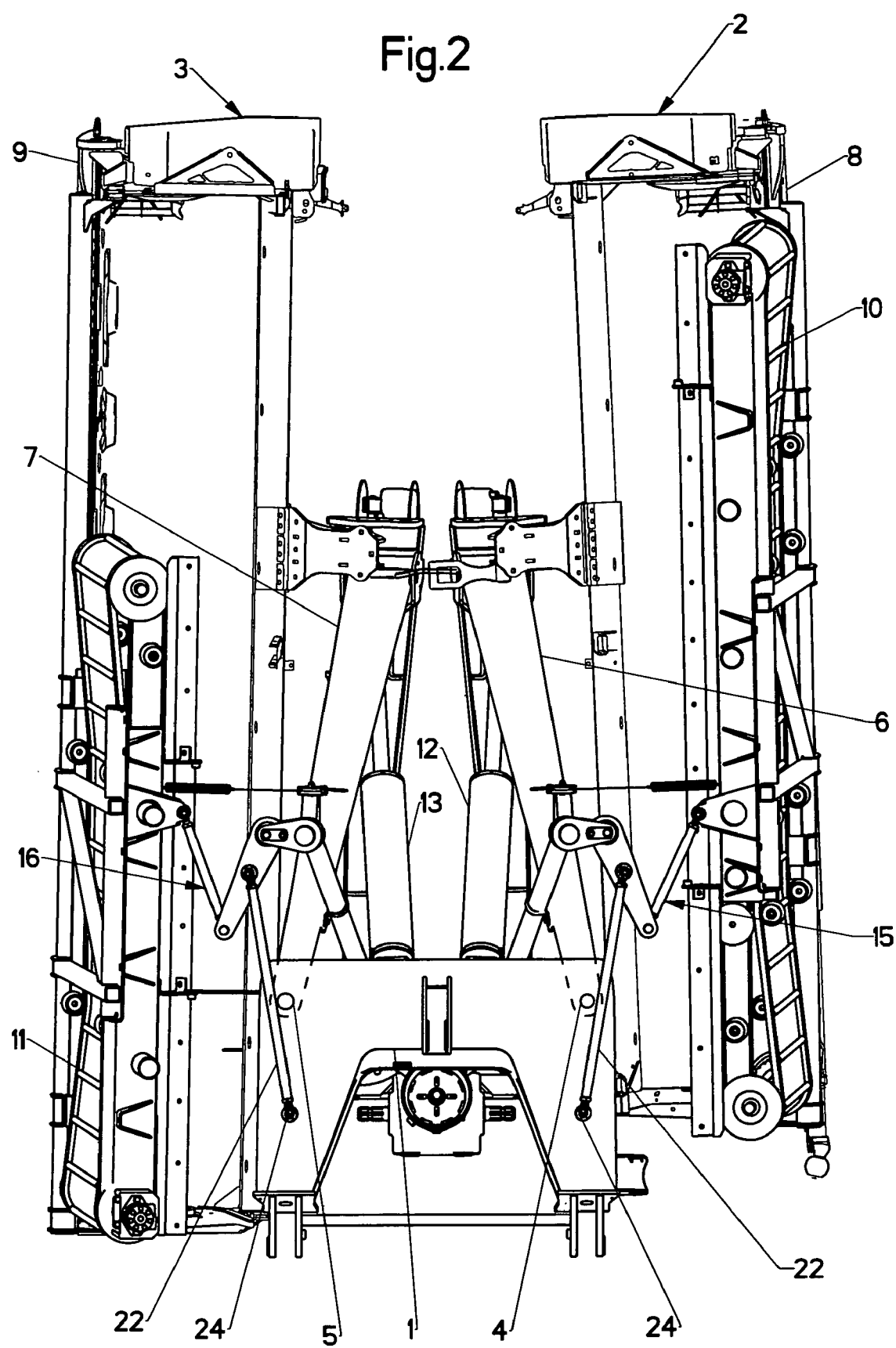
FIG. 2 represents the machine according to the invention in the transport position.

As represented in FIGS. 1 and 2, the mower according to the invention comprises a support structure 1 that can be connected to the front of a tractor serving to drive the machine and move it in the direction of travel A. On said structure 1 two mowing units 2 and 3 are articulated by means of substantially horizontal axes 4 and 5. Each of these mowing units 2 and 3 comprises a frame 6 and 7 carrying at least one cutterbar 8 and 9 and one conveyor belt 10 and 11 to group the mown products into a swath that can be deposited close to one of the lateral ends of the machine. The cutterbars 8 and 9 may be of the disk type and may be associated with rotors or rollers for conditioning the mown products. The mowing units 2 and 3 may be moved about their axes of articulation 4 and 5 from a substantially horizontal working position (FIG. 1) to a substantially vertical transport position (FIG. 2) and vice versa. These movements are made by means of hydraulic cylinders 12 and 13 connected to the structure 1 and to the corresponding mowing unit 2, 3.

Figure 4:
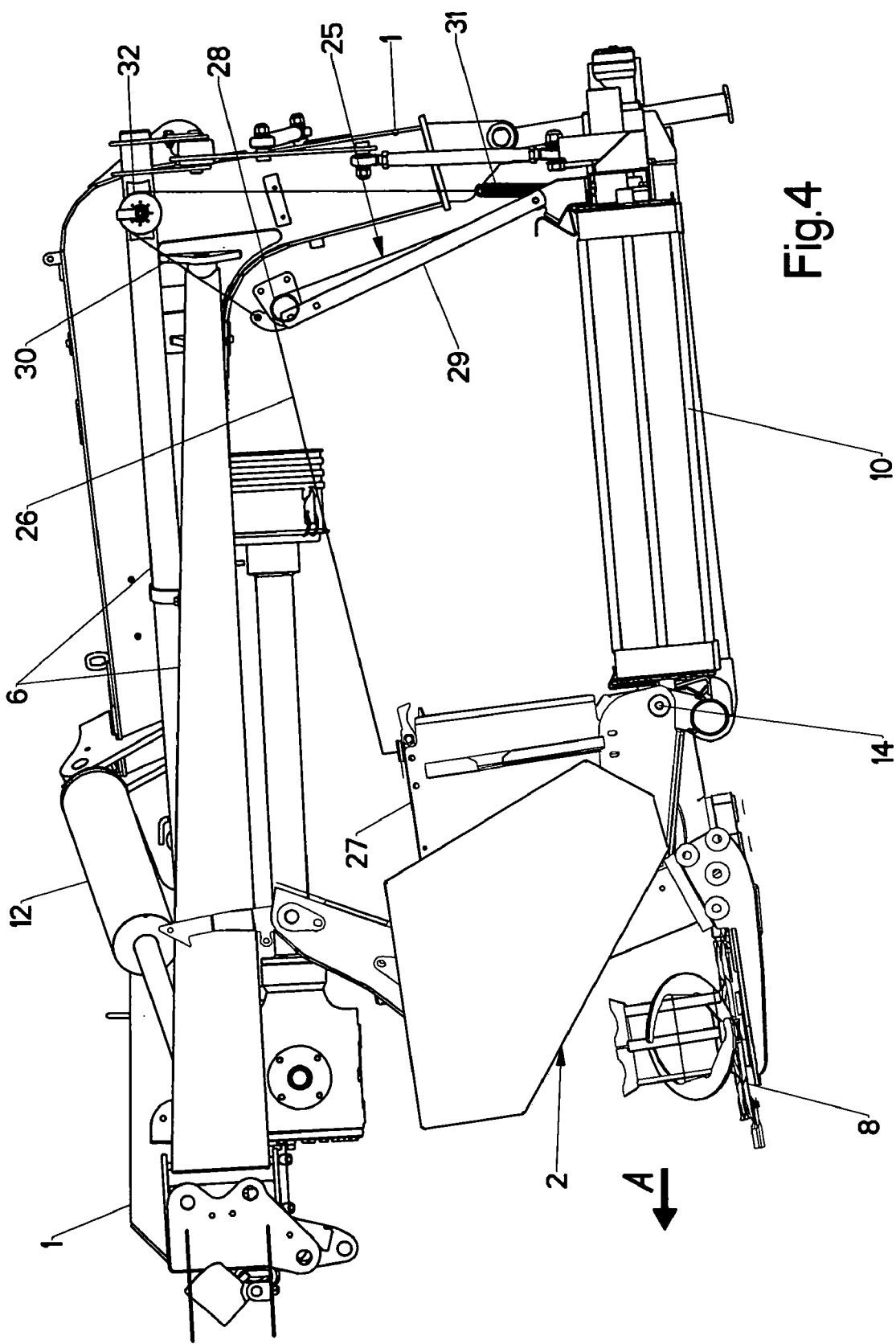
FIG. 4 represents a detail view of the swath deflector in the working position.
Figure 5:
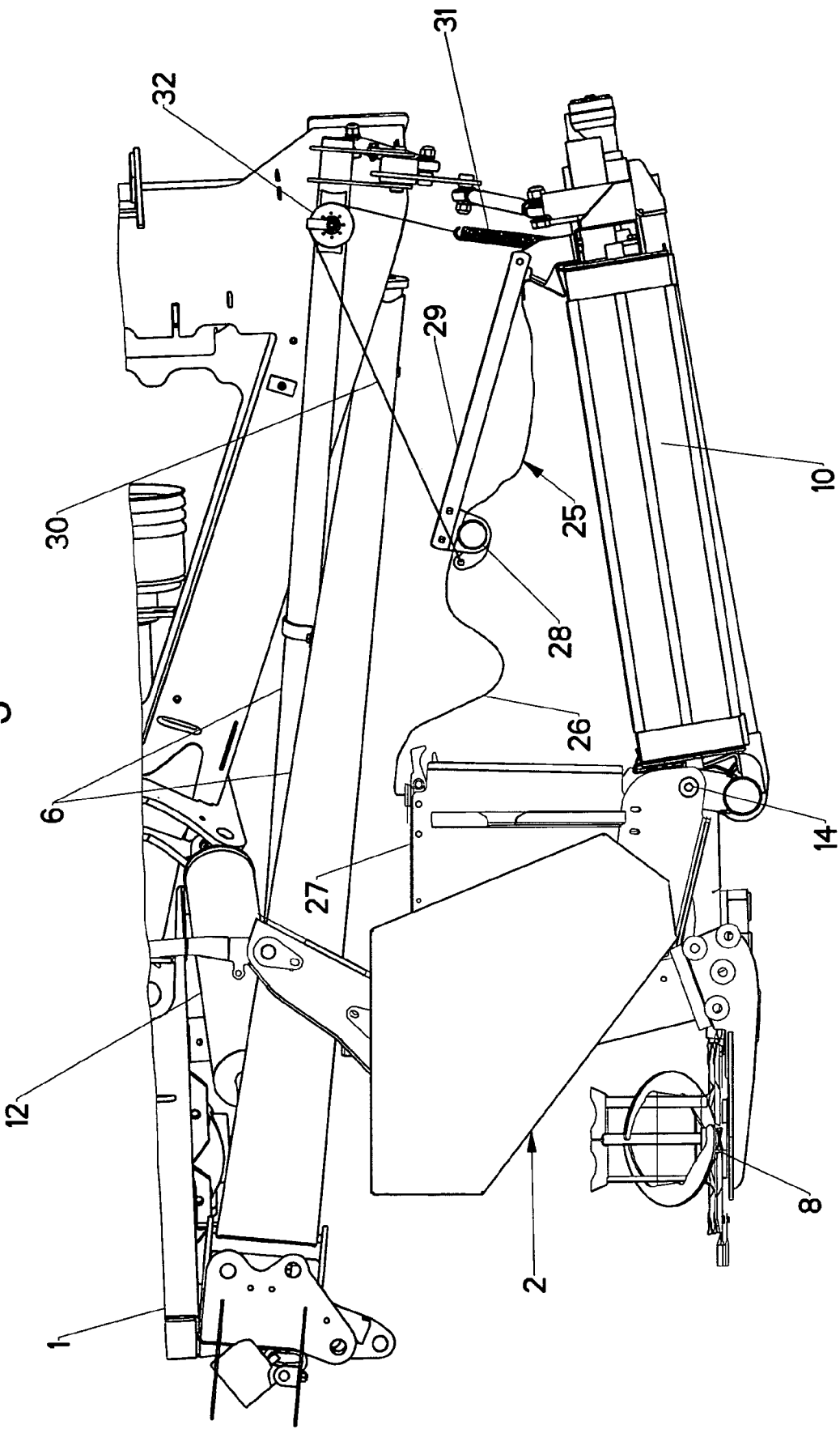
FIG. 5 represents a detail view of the swath deflector in the transport position.

The conveyor belts 10 and 11 are articulated relative to the cutterbars 8 and 9 by means of axes 14 substantially parallel to said cutterbars 8 and 9 and situated on the rear side of the latter (see FIGS. 4 and 5). Means 15 and 16 are provided for automatically moving said conveyor belts 10 and 11 relative to the cutterbars 8 and 9, about their axes of articulation 14 to bring their rear portions, that are remote from the cutterbars 8 and 9, closer to the corresponding carrier frames 6 and 7 and consequently to the middle of the mower when placed in the transport position. Conversely, these means 15 and 16 move the rear portions of the conveyor belts 10 and 11 away from the carrier frames 6 and 7 when placed in the working position.

Figure 3:
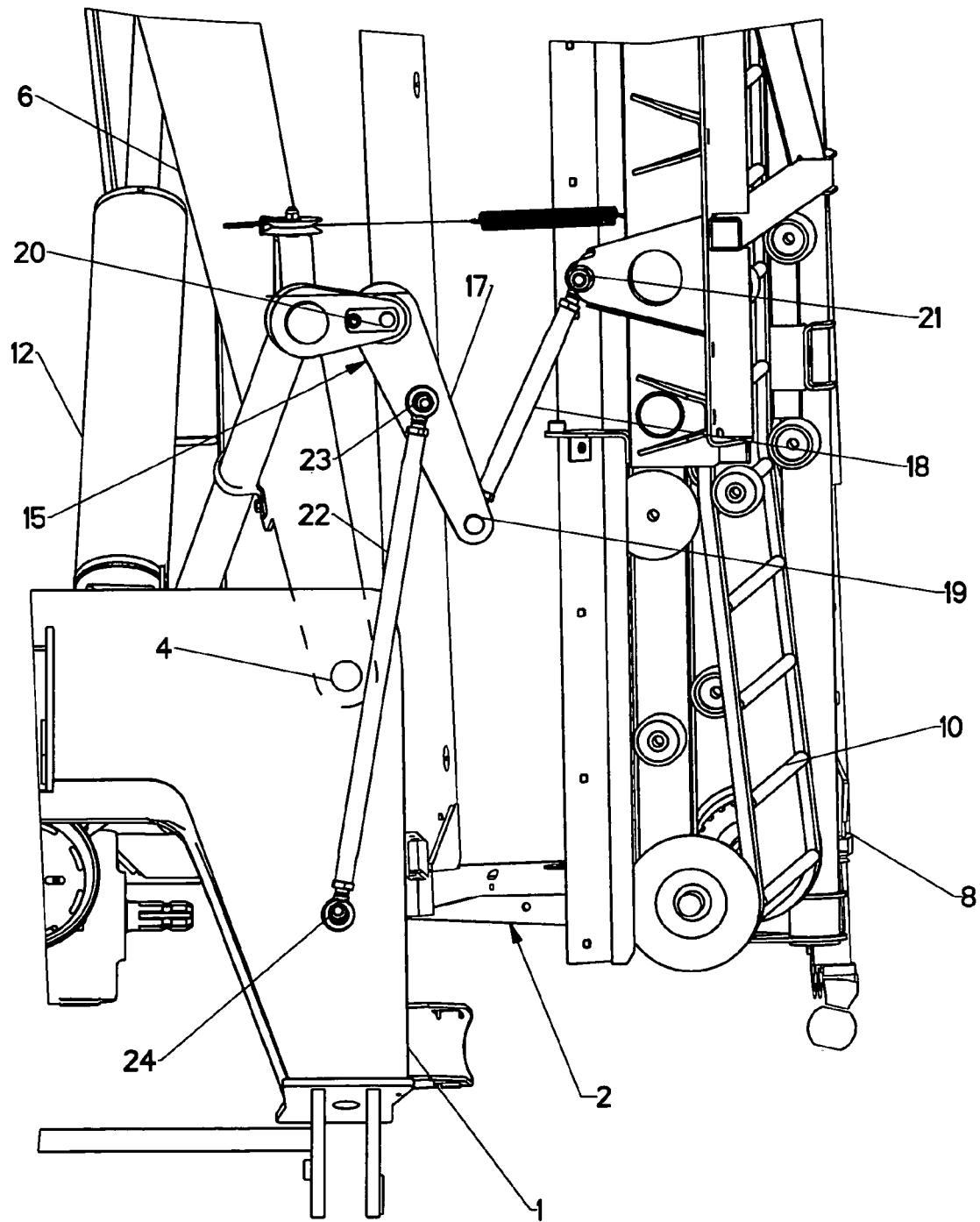
FIG. 3 represents a detail view of the means for moving the conveyor belts.

It emerges in particular from FIG. 3 that the means 15 and 16 for moving each conveyor belt 10 and 11 consist of two rods 17 and 18 articulated with one another by means of an axis 19 and the first 17 of which is articulated on the corresponding carrier frame 6, 7 by means of an axis 20 and the second 18 on the rear portion of the corresponding conveyor belt 10, 11 by means of an axis 21, and of a third rod 22 that is articulated on the first rod 17 via an axis 23 and on the support structure 1 via an axis 24. Said axes of articulation 19, 20, 21, 23 and 24 of the rods 17, 18 and 22 are substantially parallel to the axes of articulation 4 and 5 of the mowing units 2 and 3 on the structure 1. They may advantageously comprise ball joints. The axis of articulation 24 of each third rod 22 on the support structure 1 is offset toward the middle of the machine and/or toward the ground relative to the axis of articulation 4, 5 of the corresponding mowing unit 2, 3 on said support structure 1. Thanks to this offset, this third rod 22 moves the first rod 17 and the second rod 18 when the mowing units 2 and 3 are placed in the transport position and in the working position.

FIGS. 4 and 5 show that a foldable swath deflector 25 is situated on the rear side and above the conveyor belt 10, 11 of each mowing unit 2, 3. The deflector 25 prevents the products being thrown rearward over said conveyor belt 10, 11. This deflector 25 automatically moves closer to the corresponding conveyor belt 10, 11 when placed in the transport position. Conversely, it automatically moves away from said conveyor belt 10, 11 when placed in the working position to increase the free space for the passage of the conveyed products.

The foldable deflector 25 of each mowing unit 2 and 3 advantageously consists of a flexible canvas 26 connected, on one hand, to the rear side of the corresponding conveyor belt 10, 11 and, on another hand, to a guard 27 situated above the corresponding cutterbar 8, 9. This flexible canvas 26 additionally passes over a movable guide 28 in the form of a stem that extends parallel to the corresponding conveyor belt 10, 11. This guide 28 is connected to rigid cramps 29 that are articulated on the rear side of the corresponding conveyor belt 10, 11. Said guide 28 is additionally connected by means of a cable 30 to a draw-spring 31 which tends to move it away from the corresponding conveyor belt 10, 11. The cable 30 passes over a pulley 32 that is connected to the corresponding carrier frame 6, 7.

During work, the mowing units 2 and 3 are lowered to the ground and are moved in the direction of travel A. The cutterbars 8 and 9 cut the standing products and transfer them to the conveyor belts 10 and 11. The latter are substantially horizontal and are driven so that they convey said products to the side in order to deposit them in the form of a swath. In this position, the draw-springs 31 pull the guides 28 rearward so that the foldable deflectors 25 are stretched and the space between them and the conveyor belts 10 and 11 is significant.

For transport, the mowing units 2 and 3 are lifted into substantially vertical positions about the axes of articulation 4 and 5 by means of hydraulic cylinders 12 and 13. Simultaneously, the third rods 22 exert a pulling force on the first and second rods 17 and 18 and fold them in the form of a V. Consequently, the latter pull on the conveyor belts 10 and 11 and cause them to pivot about their axes of articulation 14 with the cutterbars 8 and 9 in the direction of the support frames 6 and 7.

Thus, the rear portions of these conveyor belts 10 and 11 move closer to the middle of the machine in the transport position in order to reduce the width of the assembly.

Said pivoting of the conveyor belts 10 and 11 toward the support frames 6 and 7 relaxes the draw-springs 31. The latter then no longer exert a pulling force, by means of the cables 30, on the guides 28 so that the latter move forward about the articulations of their cramps 29 on the rear side of the conveyor belts 10 and 11. The deflectors 25 then fold toward the conveyor belts 10 and 11, thereby reducing the volume that they occupy in the transport position to further reduce the width of the machine.

During the return to the working position, the rods 17, 18 and 22 automatically return the conveyor belts 10 and 11 and the foldable deflectors 25 to the positions required for work.

It is clear that the invention is not limited to the embodiment described hereinabove and represented in the appended drawings. Modifications remain possible, particularly with respect to the constitution or number of the various elements or by substitution of technical equivalents, without, for all that, departing from the field of protection.

What is claimed as new and desired to be secured by Letters Patent of the United States is:

1. A mower comprising a support structure on which are articulated about substantially horizontal axes at least two mowing units each comprising a carrier frame carrying at least one cutterbar and a conveyor belt for grouping the mown products, wherein said mowing units can be moved about said substantially horizontal axes from a substantially horizontal working position into a substantially vertical transport position, wherein the conveyor belts are articulated relative to the cutterbars about conveyor belt axes that are substantially parallel to said cutterbars and the mowing units comprise means for automatically moving said conveyor belts relative to the cutterbars about said conveyor belt axes to bring the conveyor belts closer to the corresponding carrier frames and consequently to the middle of the mower when the mowing units are placed in the transport position, wherein the means for automatically moving each conveyor belt includes a first rod and a second rod articulated with one another about a rod axis, said first rod being articulated on said carrier frame about a first axis and the second rod being articulated on said conveyor belt about a second axis, and a third rod articulated on the first rod via a third axis and on the support structure via a fourth axis which is offset relative to the substantially horizontal axis of articulation of the corresponding mowing unit on said support structure.

2. A mower as claimed in claim 1, wherein the fourth axis of articulation of the third rod on the support structure is situated closer to the ground or closer to the middle of the mower than the axis of articulation of the corresponding mowing unit on said support structure.

3. A mower as claimed in claim 1, further comprising a foldable swath deflector is situated on the rear side and above the conveyor belt of each mowing unit.

4. A mower as claimed in claim 3, wherein the foldable deflector automatically moves closer to the corresponding conveyor belt when placed in the transport position.

5. A mower as claimed in claim 4, wherein the foldable deflector includes a flexible canvas connected to the rear side of the corresponding conveyor belt and to a fixed guard situated above the corresponding cutterbar, wherein said flexible canvas additionally passes over a movable guide.

6. A mower as claimed in claim 5, wherein the movable guide is connected to cramps that are articulated on the rear side of the corresponding conveyor belt.

7. A mower as claimed in claim 6, wherein the movable guide is connected by a cable to a draw-spring which tends to move the movable guide away from the corresponding conveyor belt.

8. A mower as claimed in claim 7, wherein the cable passes over a pulley that is connected to the corresponding carrier frame.

9. A mower as claimed in claim 1, wherein each mowing unit extends from an inner end to an outer lateral end in a direction parallel to said conveyor belt axes, and each conveyor belt extends from said inner end to said outer lateral end.

10. A mower as claimed in claim 9, wherein the cutterbars are positioned in front of said conveyor belts relative to a direction of travel of said mower for said working position such that each conveyor belt conveys product mown by a corresponding cutterbar to said outer lateral end.

11. A mower as claimed in claim 1, wherein said conveyor belt axes are substantially perpendicular to said substantially horizontal axes in said working position and in said transport position.

12. A mower as claimed in claim 11, wherein said conveyor belt axes are substantially horizontal in said working position and are substantially vertical in said transport position.

* * * * *